United States Patent [19]

de Jong et al.

[11] 4,425,509

[45] Jan. 10, 1984

[54] TURBOFLAPPER NOZZLE SYSTEMS

[75] Inventors: Joannes N. M. de Jong, Westford; Richard L. Earle, Mendon; Anthony P. Nardi, Burlington, all of Mass.

[73] Assignee: Sperry Corporation, New York, N.Y.

[21] Appl. No.: 297,532

[22] Filed: Aug. 31, 1981

[51] Int. Cl.³ .......................... G05D 16/20; H02P 9/04
[52] U.S. Cl. .................................... 290/40 C; 137/56; 137/83; 290/1 R
[58] Field of Search ............... 290/1 R, 40 C; 137/56, 137/83

[56] References Cited

U.S. PATENT DOCUMENTS

| | | | |
|---|---|---|---|
| 237,354 | 2/1881 | Wood | 137/56 |
| 2,402,972 | 7/1946 | Mitchell | 137/56 |
| 2,916,635 | 12/1959 | Nicita | 290/40 C |

Primary Examiner—G. Z. Rubinson
Assistant Examiner—Shelley Wade
Attorney, Agent, or Firm—Howard P. Terry

[57] ABSTRACT

In a flapper nozzle actuator system a radial outward flow turbine like flapper is used as the flapper. The angular velocity of the turboflapper is used to lift the turboflapper off a backplate towards a nozzle. The amount of lift off the backplate and hence nozzle outlet area is a function of the angular velocity of the turboflapper. An adjustable opposing torque on the turboflapper controls the angular velocity of the turboflapper and thus controls the flow rate.

2 Claims, 4 Drawing Figures

TURBOFLAPPER NOZZLE SYSTEMS

BACKGROUND OF THE INVENTION

1. Field of the Invention

The present invention relates to fluid control systems and more specifically to a novel flapper nozzle actuator system having a rotatable turbine like flapper.

2. Description of the Prior Art

Nozzle flapper valves are well known in the art and are often used as pilot valves in industrial control instruments. Typically, the conventional electrohydraulic nozzle flapper actuator system includes a nozzle coupled to a pressurized fluid supply and a flapper. As fluid is discharged from the nozzle, it displaces the flapper and the distance between the flapper and the nozzle is proportional to the force exerted by the fluid. An electric torque motor is commonly used to adjust the distance between the flapper and the nozzle by moving the flapper, thereby adjusting the pressure of the fluid.

There are several disadvantages associated with conventional nozzle flapper actuator systems. The electric torque motors utilized in conventional nozzle flapper actuator systems require external electrical power which is often an inconvenience to supply. There is also a tendency for dirt to accumulate between the nozzle and the flapper, thus making the system relatively sensitive to dirt. Moreover, conventional nozzle flapper actuator systems tend to be bulky.

Accordingly, there is a need for small nozzle flapper actuator system which is relatively insensitive to dirt and which requires no external source of electrical power.

SUMMARY OF THE INVENTION

The apparatus of the present invention provides a novel flapper nozzle actuator system which replaces the flapper and torque motor of a conventional flapper nozzle actuator system with a rotatable turbine like flapper and braking means. A generally conventional nozzle coupled to a pressurized fluid supply discharges the fluid against the blades of the turboflapper causing it to rotate and to provide a self cleaning action. The turboflapper is preferably coupled by a shaft and a thrust bearing to the braking means comprised of a d.c. generator and a variably adjusted load. As the turboflapper rotates, the axial thrust bearing displaces the turboflapper along its axis of rotation as a function of its angular velocity which can be regulated by the braking means. The displacement of the turboflapper along its axis of rotation is proportioned to the pressure exerted by the fluid.

DESCRIPTION OF THE PREFERRED EMBODIMENTS

Figure 1:
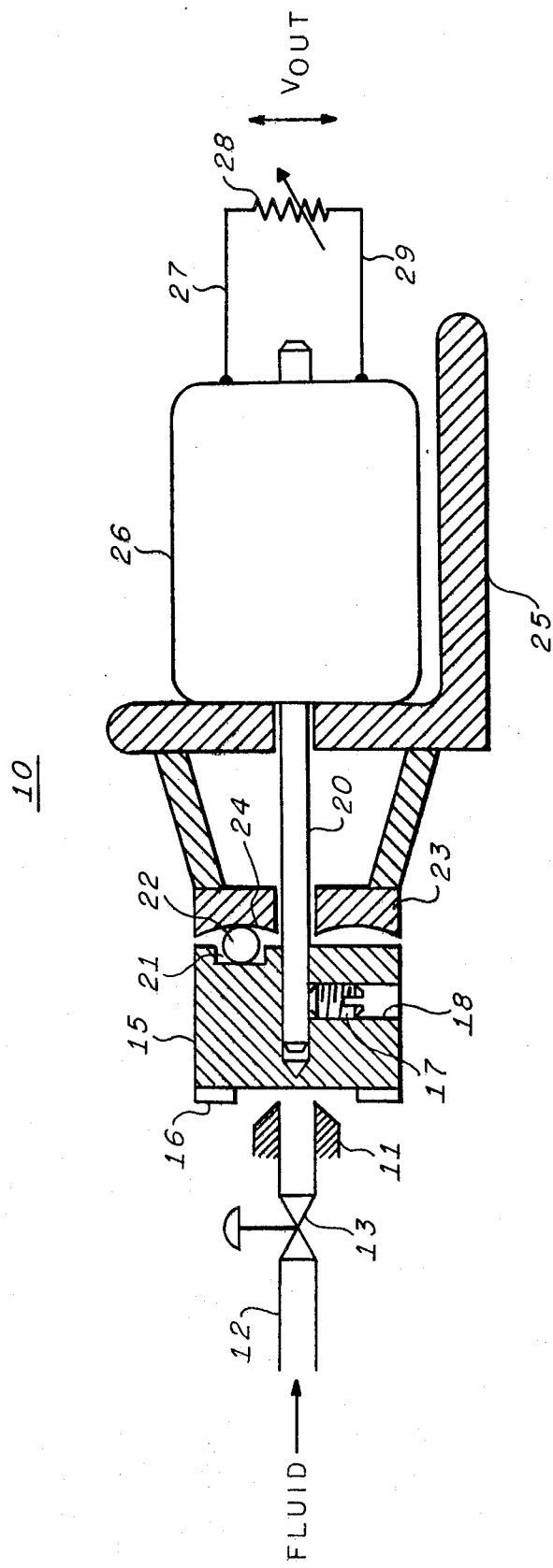
FIG. 1 is an elevation view partly in cross section of the apparatus of the present invention.

Referring now to FIG. 1, a side view partly in cross section illustrates the turboflapper nozzle actuator system 10 of the present invention. The turboflapper nozzle actuator system 10 includes a generally conventional nozzle 11 which is coupled to a supply (not shown) of pressurized fluid, either liquid or gas, by a conduit 12 and a valve or restriction 13. The fluid flow discharged through the nozzle 11 impinges against the rotatable turboflapper 15 which is illustrated in greater detail in FIGS. 2, 3 and 4.

Figure 2:
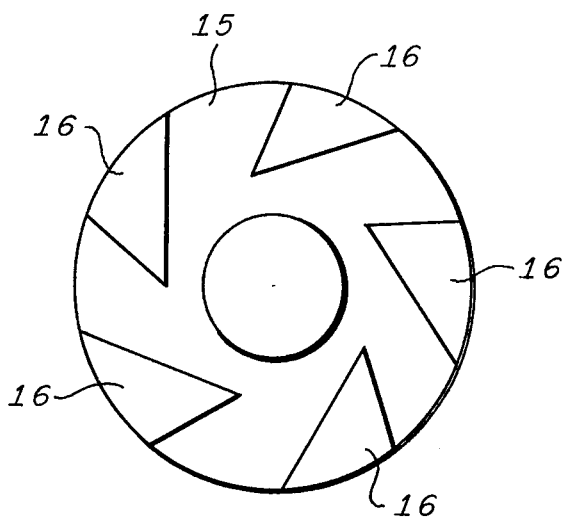
FIGS. 2, 3 and 4 are front, cross sectional side, and rear views, respectively, of the rotatable turbine like flapper.
Figure 3:
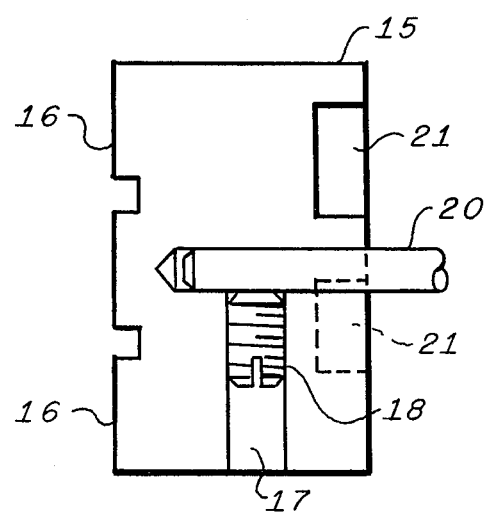
Figure 4:
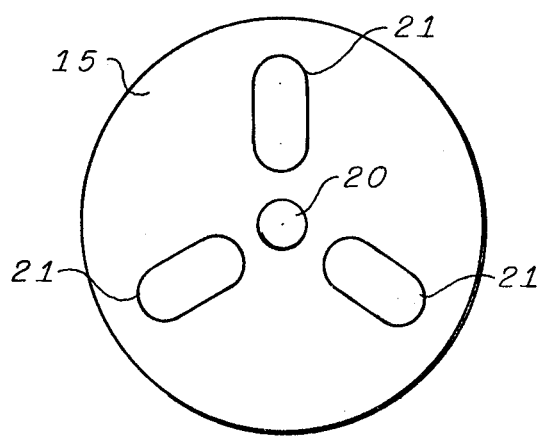

FIGS. 2, 3, and 4 illustrate front, cross sectional side, and rear views, respectively, of the turboflapper 15. Preferably the turboflapper 15 is machined from a cylindrical piece of metal and includes a plurality of blades 16 which are responsive to pressurized fluid from the nozzle 11. The blades 16 may be in the form of either spirally arranged fins or grooves. The turboflapper 15 further includes a threaded hole 17 for set screw 18, which secures a shaft 20 to the turboflapper 15. The rear surface of the turboflapper 15 includes a plurality of radial slots 21 milled therein.

Referring back to FIG. 1, it can be appreciated that a steel ball bearing 22 is disposed in each of the radial slots 21. A backplate 23 having a generally curved or concave surface is disposed behind the flapper 15 to form a thrust bearing 24 in combination with the steel ball bearings 22 and the radial slots 21. The curved backplate 23 is fixed to a support 25 and includes an aperture through which extends the shaft 20. The shaft 20 extends from a d.c. generator 26 which is also fixed to the support 25. There is a small amount of axial play on the order of 0.04 inches in the shaft 20 of the d.c. generator 26. The axial leads 27 of the generator 26 are coupled to a variable resistor 28.

In operation, fluid is admitted to the nozzle 11 from the pressurized supply (not shown) via the conduit 12 and the valve or restriction 13. The fluid is discharged from the nozzle 11 and impinges against the turboflapper 15 which is free to rotate. The axially flowing fluid is deflected radially by the blades 16 of the turboflapper 15 and exerts a torque on the turboflapper 15, resulting in an angular velocity. In essence, this arrangement is similar to a radially outward flow hydraulic turbine.

The torque exerted on the turboflapper 15 causes the shaft 20 of the d.c. generator 26 to rotate at an angular velocity. The braking system which is comprised of the d.c. generator 26 and the variable resistor 28 is dissipative in nature and can regulate the angular velocity of the turboflapper 15 by adjusting the resistive load provided by the variable resistor 28. Alternatively, a friction brake or an eddy current brake could be used to regulate the angular velocity of the turboflapper 15, by creating a load torque on the shaft 20. It should be noted, however, that a particular advantage associated with the preferred embodiment having the d.c. generator 26 is that the device can generate its own electrical power which may be utilized for control purposes.

The thrust bearing 24 lifts the turboflapper 15 off the curved backplate 23 in response to the axial force of the fluid. The axial flow of fluid causes the turboflapper 15 to rotate and the ball bearings 22 ride on the curved backplate 23 in the slots 21. As the angular velocity of the turboflapper 15 increases, the ball bearings 22 will move outward, thus providing an axial displacement for the turboflapper 15. It should be noted that axial displacement of the turboflapper 15 could be limited by the amount of axial play in the shaft 20 of the generator 26. Preferably, however, the amount of lift or axial displacement varies only as a function of the angular velocity of the turboflapper 15, thus also making the nozzle outlet area and nozzle flow rate a function of angular velocity. Alternatively, the axial displacement of the turboflapper may be provided by a hydrodynamically lubricated axial thrust bearing, a governor or watts regulator type bearing, or an eddy current induced levitation system.

While the invention has been described in its preferred embodiments, it is to be understood that the words that have been used are words of description rather than of limitation and that changes within the purview of the appended claims may be made without departing from the true scope and spirit of the invention in its broader aspects.

We claim:

1. A flapper nozzle system comprising:

a nozzle coupled to a supply of pressurized fluid;

rotatable flapper means having a plurality of blades responsive to fluid flow from said nozzle, said rotatable flapper means including a cylindrical member which is mounted for rotation in a support and which has a plurality of blades disposed on a front surface, a plurality of slots disposed on a rear surface, and a shaft coupled thereto;

means for displacing said rotatable flapper means as a function of its angular velocity along its axis of rotation, said displacing means including a curved backplate coupled to said support, wherein said curved backplate retains a plurality of ball bearings disposed in the slots of said rotatable flapper means and permits the rotation and axial displacement of said shaft coupled to said rotatable flapper means; and braking means for placing a variably adjusted load on said rotatable flapper means, said braking means including an electrical generator, coupled to said shaft of said rotatable flapper, and variable resistor coupled to the output leads of said electrical generator.

2. An apparatus as in claim 1 wherein said nozzle is coupled to said supply of pressurized fluid via a conduit having an adjustable valve.

* * * * *